(12) United States Patent
Tanaka et al.

(10) Patent No.: US 12,541,210 B2
(45) Date of Patent: Feb. 3, 2026

(54) UNMANNED VEHICLE AND DELIVERY SYSTEM

(71) Applicant: RAKUTEN GROUP, INC., Tokyo (JP)

(72) Inventors: Daiki Tanaka, Tokyo (JP); Toshiaki Tazume, Tokyo (JP); Takayoshi Inuma, Tokyo (JP); Asaki Matsumoto, Tokyo (JP); Masato Tani, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 0 days.

(21) Appl. No.: 18/267,233

(22) PCT Filed: Apr. 25, 2022

(86) PCT No.: PCT/JP2022/018726
§ 371 (c)(1),
(2) Date: Jun. 14, 2023

(87) PCT Pub. No.: WO2023/209772
PCT Pub. Date: Nov. 2, 2023

(65) Prior Publication Data
US 2025/0044811 A1    Feb. 6, 2025

(51) Int. Cl.
*G05D 1/656* (2024.01)
*B64U 10/13* (2023.01)
(Continued)

(52) U.S. Cl.
CPC ............. *G05D 1/665* (2024.01); *B64U 10/13* (2023.01); *G06V 20/17* (2022.01);
(Continued)

(58) Field of Classification Search
CPC ............. G05D 1/665; G05D 2105/285; G05D 2109/254; B64U 10/13; B64U 2101/66;
(Continued)

(56) References Cited

U.S. PATENT DOCUMENTS

2017/0123425 A1* 5/2017 Zhao ..................... G05D 1/102
2019/0041852 A1* 2/2019 Schubert ............ G06Q 10/0836
(Continued)

FOREIGN PATENT DOCUMENTS

CN        108139758 A      6/2018
JP        2019-16157 A     1/2019
(Continued)

OTHER PUBLICATIONS

EPO machine translated description of reference JP-2021096865-A. (Year: 2021).*
(Continued)

*Primary Examiner* — Navid Z. Mehdizadeh
*Assistant Examiner* — Shelley Marie Osterhout
(74) *Attorney, Agent, or Firm* — Sughrue Mion, PLLC

(57) ABSTRACT

In a delivery system S including an UAV 1 and a management server 2, the UAV 1 controls at least a position and/or an orientation of the UAV 1 so that a package placed in a release location and a peripheral region of the package fall within an angle of view of a camera. And then, the UAV 1 saves, as an image that proves delivery completion of the package, an image of the peripheral region including the package captured by the camera in a storage unit 15 of the UAV 1 or a storage unit 22 of the management server 2.

16 Claims, 12 Drawing Sheets

(51) Int. Cl.
*B64U 101/66* (2023.01)
*G05D 105/28* (2024.01)
*G05D 109/25* (2024.01)
*G06V 20/17* (2022.01)

(52) U.S. Cl.
CPC ... *B64U 2101/66* (2023.01); *G05D 2105/285* (2024.01); *G05D 2109/254* (2024.01)

(58) Field of Classification Search
CPC ............ B64U 2101/30; B64U 2101/64; B64U 2201/00; G06V 20/17; G06Q 10/083; G03B 15/006
See application file for complete search history.

(56) References Cited

U.S. PATENT DOCUMENTS

| | | | | |
|---|---|---|---|---|
| 2020/0154032 A1* | 5/2020 | Yu | ........................ | H04N 23/745 |
| 2021/0280074 A1* | 9/2021 | Ali | ......................... | H04L 9/006 |
| 2021/0304343 A1* | 9/2021 | Spjuth | .............. | G06Q 10/06314 |
| 2021/0350320 A1 | 11/2021 | Munafo et al. | | |
| 2023/0252649 A1* | 8/2023 | Lu | .......................... | G06V 10/62 |
| | | | | 382/103 |

FOREIGN PATENT DOCUMENTS

| | | | |
|---|---|---|---|
| JP | 2021-96865 A | | 6/2021 |
| JP | 2021096865 A | * | 6/2021 |
| WO | 2019/137167 A1 | | 7/2019 |

OTHER PUBLICATIONS

International Search Report for PCT/JP2022/018726 dated Jul. 12, 2022.

Translation of Office Action issued Dec. 5, 2025 by the China National Intellectual Property Administration in Chinese Patent Application No. 202280008215.0.

* cited by examiner

UNMANNED VEHICLE AND DELIVERY SYSTEM

This Application is a National Stage of International Application No. PCT/JP2022/018726 filed Apr. 25, 2022.

TECHNICAL FIELD

The present invention relates to a technical field of a delivery system and the like for delivering a package.

BACKGROUND ART

Conventionally, as a package delivery method, for example, so-called unattended delivery, in which a deliverer completes delivery by placing a package on a site of a recipient's house, is known. For example, Patent Literature 1 discloses a system in which a deliverer photographs a picture of a package the unattended delivery of which is completed with a terminal, and the photographed image is transmitted to a terminal of a recipient.

CITATION LIST

Patent Literature

Patent Literature 1: JP 2019-16157 A

SUMMARY OF INVENTION

Technical Problem

However, in a case where an unmanned vehicle that does not require a deliverer performs the unattended delivery, the deliverer cannot photograph an image of a package for which the delivery is completed, and it is thus difficult to save an appropriate image for proving the delivery completion. In particular, in a case where a package is placed at any position in a large site of a recipient's house, it is desirable to save an image that allows the recipient to determine the position.

Therefore, one or more embodiments of the present invention are directed to providing an unmanned vehicle and a delivery system capable of saving an appropriate image for proving delivery completion of a package.

Solution to Problem

In response to the above issue, the invention according to claim 1 is an unmanned vehicle for delivering a package, the unmanned vehicle including: a camera configured to image a range falling within an angle of view; a first control unit configured to release the package from the unmanned vehicle; and a second control unit configured to control at least a position and/or an orientation of the unmanned vehicle so that the package placed in a release location by the first control unit and a peripheral region of the package fall within the angle of view, and to save at least one image of the package and the peripheral region captured by the camera in a save unit as at least one image that proves delivery completion of the package. This makes it possible to save an appropriate image for proving the delivery completion of the package.

The invention according to claim 2 is the unmanned vehicle according to claim 1, wherein the second control unit detects, in the range, at least one or more features serving as a mark in addition to the package placed in the release location, and saves in the save unit at least the image of the package and the peripheral region including the one or more features captured at a moment when the one or more features are detected in addition to the package as the image that proves the delivery completion of the package. This makes it possible to save the image specific to a delivery destination of the package.

The invention according to claim 3 is the unmanned vehicle according to claim 2, wherein the second control unit detects a plurality of said features located at different positions in addition to the package, and saves in the save unit at least the image of the package and the peripheral region including the plurality of features captured at a moment when the plurality of features are detected in addition to the package as the image that proves the delivery completion of the package. This makes it possible to further save the image specific to a delivery destination of the package.

The invention according to claim 4 is the unmanned vehicle according to claim 2 or 3, wherein the second control unit calculates a change rate of a color value in each of a plurality of consecutive images captured by the camera, and detects the one or more features at a moment when the change rate becomes equal to or higher than a first threshold value. This makes it possible to reduce the processing load applied to the unmanned vehicle until the image for proving the delivery completion is saved, to reduce a power consumption of a battery of the unmanned vehicle, and also to shorten the time until the image is saved.

The invention according to claim 5 is the unmanned vehicle according to claim 2 or 3, wherein the unmanned vehicle is an unmanned aerial vehicle that can fly in an unmanned manner, and the second control unit raises or lowers the unmanned vehicle after the package is released, and detects the one or more features in addition to the package while the unmanned vehicle is being raised or lowered.

The invention according to claim 6 is the unmanned vehicle according to claim 5, wherein the second control unit causes the unmanned vehicle to hover at a moment when the one or more features are detected in addition to the package, and saves in the save unit the image of the package and the peripheral region including the one or more features captured while the unmanned vehicle is hovering as the image that proves the delivery completion of the package. This makes it possible to save a clearer image.

The invention according to claim 7 is the unmanned vehicle according to claim 5, wherein the second control unit acquires information indicating brightness around the unmanned vehicle, measured by an exposure meter included in the camera, and changes a speed at which the unmanned vehicle is raised or lowered according to the brightness. This makes it possible to save a clearer image.

The invention according to claim 8 is the unmanned vehicle according to claim 1, wherein the second control unit calculates a change rate of a color value in each of consecutive images captured by the camera, and saves in the save unit an image captured at a moment when the change rate becomes equal to or higher than a first threshold as the image that proves the delivery completion of the package. This makes it possible to reduce the processing load applied to the unmanned vehicle until the image for proving the delivery completion is saved, to reduce a power consumption of a battery of the unmanned vehicle, and also to shorten the time until the image is saved.

The invention according to claim 9 is the unmanned vehicle according to claim 8, wherein the unmanned vehicle is an unmanned aerial vehicle that can fly in an unmanned manner, and the second control unit raises or lowers the unmanned vehicle after the package is released, and calculates the change rate of the color value in the image while the unmanned vehicle is being raised or lowered.

The invention according to claim 10 is the unmanned vehicle according to claim 9, wherein the second control unit causes the unmanned vehicle to hover at the moment when the change rate becomes equal to or higher than the first threshold value, and saves in the save unit the image captured while the unmanned vehicle is hovering as the image that proves the delivery completion of the package. This makes it possible to save a clearer image.

The invention according to claim 11 is the unmanned vehicle according to claim 9 or 10, wherein the second control unit acquires information indicating brightness around the unmanned vehicle, measured by an exposure meter included in the camera, and changes a speed at which the unmanned vehicle is raised or lowered according to the brightness. This makes it possible to save a clearer image.

The invention according to claim 12 is the unmanned vehicle according to any one of claims 1 to 3 and 8 to 10, wherein the second control unit saves in the save unit the image of the package and the peripheral region captured at a moment when the package is released and the image of the package and the peripheral region including the one or more features captured at the moment when the one or more features are subsequently detected in addition to the package as the images that prove the delivery completion of the package. As a result, even in a case where it is difficult for a recipient of the package to visually recognize the package because the package appearing in the saved image is small, the recipient can easily visually recognize the package from an enlarged image of the package.

The invention according to claim 13 is the unmanned vehicle according to any one of claims 1 to 3 and 8 to 10, wherein the second control unit identifies proof appropriateness of the captured image, and saves in the save unit the captured image as the image that proves the delivery completion the package in a case where the proof appropriateness is equal to or higher than a second threshold value. This makes it possible to enhance the usefulness of the image for proving the delivery completion of the package.

The invention according to claim 14 is the unmanned vehicle according to claim 13, wherein, in a case where the proof appropriateness of the image that is second captured after the image that is first is saved in the save unit is higher than the proof appropriateness of the image that is first, the second control unit deletes the image that is first from the save unit, and saves in the save unit the image that is second as the image that proves the delivery completion of the package. This makes it possible to further enhance the usefulness of the image for proving the delivery completion of the package, and also to suppress the memory capacity further than in a case of saving a plurality of images.

The invention according to claim 15 is the unmanned vehicle according to any one of claims 1 to 3 and 8 to 10, further comprising an image providing unit configured to provide the image saved in the save unit to a terminal of a recipient of the package. This makes it possible to visually notify the recipient of the delivery completion of the package.

The invention according to claim 16 is a delivery system for delivering a package by means of an unmanned vehicle mounting a camera configured to image a range falling within an angle of view, the delivery system including: a control unit configured to control at least a position and/or an orientation of the unmanned vehicle so that the package released from the unmanned vehicle and thus placed in a release location and a peripheral region of the package fall within the angle of view, and to save an image of the package and the peripheral region captured by the camera in a save unit as an image that proves delivery completion of the package.

The invention according to an aspect of the disclosure is a control device for an unmanned vehicle that mounts a camera configured to image a range falling within an angle of view and delivers a package, wherein the control device controls at least a position and/or an orientation of the unmanned vehicle so that the package released from the unmanned vehicle and thus placed in a release location and a peripheral region of the package fall within the angle of view, and saves an image of the package and the peripheral region captured by the camera in a save unit as an image that proves delivery completion of the package.

Advantageous Effect of the Invention

According to one or more embodiments of the present invention, it is possible to save an appropriate image for proving the delivery completion of the package.

DESCRIPTION OF EMBODIMENTS

Hereinbelow, one or more embodiments of the present invention will be described with reference to the drawings. Incidentally, the following embodiment is an embodiment of a delivery system for delivering a package.

[1. Configuration of Delivery System S]

Figure 1:
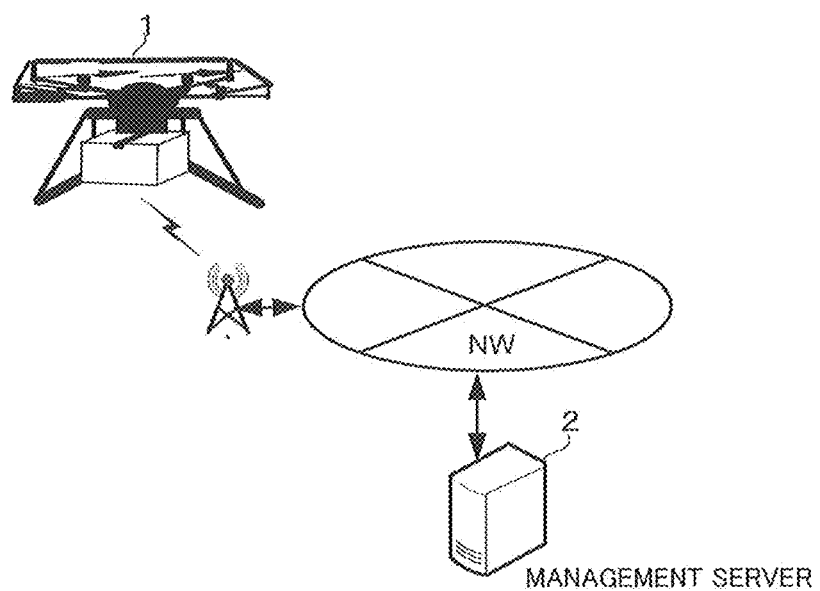
FIG. 1 is a diagram illustrating a schematic configuration example of a delivery system S.

First, a configuration of a delivery system S according to an embodiment of the present invention will be described with reference to FIG. 1. FIG. 1 is a diagram illustrating a schematic configuration example of the delivery system S. As illustrated in FIG. 1, the delivery system S includes an unmanned aerial vehicle (hereinbelow referred to as a "UAV (Unmanned Aerial Vehicle)") 1 and a management server 2, and the UAV 1 and the management server 2 are connectable to a communication network NW. Here, the communication network NW includes, for example, the Internet, a mobile communication network and wireless base stations thereof, or the like. The UAV 1 is an example of an unmanned vehicle, and is also called a drone or a multi-copter. The management server 2 is a server for managing and controlling delivery of packages. The management server 2 can also control the UAV 1. The management server 2 can communicate with the UAV 1 via the communication network NW.

The package (cargo) loaded on the UAV 1 is, for example, an item such as a product and a home delivery article ordered at an EC (Electronic commerce) website, a home delivery website, or the like. Such a package is transported from a delivery station to a delivery destination (shipping destination) designated by an order from a delivery requester (for example, an orderer of the product). Here, the delivery station is a place where the package is loaded onto the UAV 1. The delivery destination is, for example, a residence where the recipient of the package lives or the like. However, in the present embodiment, it is assumed that the UAV 1 releases the package in the vicinity of the delivery destination and places the package at a release location to complete the delivery (that is, unattended delivery). Such unattended delivery may be performed, for example, in a case where unattended delivery is set as a delivery method at the time of ordering, or in a case where the recipient cannot directly receive the package due to absence at the delivery destination, or in other cases. The delivered package is placed, for example, at any release location on the site of the residence where the recipient lives (for example, a yard). In a case where the residence is collective housing (for example, a condominium or an apartment), the delivered package may be placed in the vicinity of a common entrance of the building or in any release location on the rooftop of the building. Incidentally, the release location is a ground surface or a rooftop surface of a building.

[1-1. Configuration and Functions of UAV 1]

Figure 2:
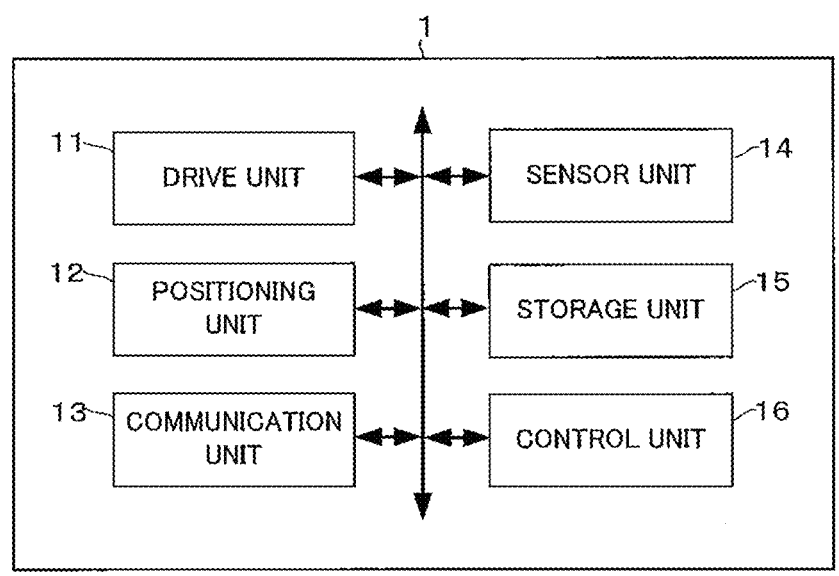
FIG. 2 is a diagram illustrating a schematic configuration example of an UAV 1.

Next, a configuration and functions of the UAV 1 will be described with reference to FIG. 2. FIG. 2 is a diagram illustrating a schematic configuration example of the UAV 1. As illustrated in FIG. 2, the UAV 1 includes a drive unit 11, a positioning unit 12, a communication unit 13, a sensor unit 14, a storage unit 15 (an example of a save unit), a control unit 16 (an example of a control device), and the like. The UAV 1 also includes a battery (not illustrated) that supplies power to the respective units of the UAV 1, rotors (propellers) that are horizontal rotary wings, a holding mechanism for holding a loaded package, and the like. The holding mechanism includes a holding member such as a hook for holding a package, and an actuator including a motor and the like. The holding mechanism releases the package (that is, separates the package) from the holding member by driving the actuator in accordance with a control signal output from the control unit 16. Incidentally, the holding mechanism may include a linear member such as a wire connected to the holding member, and a reel (winch) for feeding or winding the linear member.

The drive unit 11 includes a motor, a rotation shaft, and the like. The drive unit 11 rotates the plurality of rotors by means of the motor driven in response to a control signal output from the control unit 16, the rotation shaft, and the like. The positioning unit 12 includes an electric wave receiver, an altitude sensor, and the like. For example, the positioning unit 12 receives electric waves transmitted from a GNSS (Global Navigation Satellite System) satellite by means of the electric wave receiver, and detects the current position (latitude and longitude) of the UAV 1 in the horizontal direction on the basis of the electric waves. Incidentally, the current position of the UAV 1 in the horizontal direction may be corrected on the basis of an image captured by a camera of the sensor unit 14. Moreover, the current position of the UAV 1 in the horizontal direction may be corrected by an RTK (Real Time Kinematic) method using the electric waves received by a reference station (reference station communicable with the UAV 1) whose installation position is identified. Positional information indicating the current position detected by the positioning unit 12 is output to the control unit 16. Furthermore, the positioning unit 12 may detect the current position (altitude) of the UAV 1 in the vertical direction by means of an altitude sensor such as an atmospheric pressure sensor. In this case, the positional information includes altitude information indicating the altitude of the UAV 1.

The communication unit 13 has a wireless communication function and serves to control communication performed via the communication network NW. The sensor unit 14 includes various sensors used for flight control and the like of the UAV 1. Examples of the various sensors include an optical sensor, a triaxial angular velocity sensor, a triaxial acceleration sensor, a geomagnetic sensor, and the like. The optical sensor includes a camera (for example, an RGB camera). The camera includes a lens, an imaging element, a shutter, an exposure meter, and the like, and images a range within an angle of view in response to an imaging command from the control unit 16. The angle of view is an angle representing a range in which light from the outside is applied to the imaging element via the lens. Here, imaging refers to capturing an image by converting light received by the imaging element into an electric signal. The optical sensor may include a camera for imaging the traveling direction of the UAV 1 and a camera for imaging the lower side of the UAV 1. Moreover, the orientation of the camera may be controlled by the control unit 16. The exposure meter measures brightness around the UAV 1. The shutter speed and the diaphragm of the camera are automatically adjusted according to the brightness measured by the exposure meter.

Incidentally, the optical sensor may include a LiDAR (Light Detection and Ranging or Laser Imaging Detection and Ranging) sensor that measures a shape of an object or a distance to the object. Sensing information obtained by sensing by the sensor unit 14 is continuously output to the control unit 16. The sensing information includes data of an image (for example, an RGB image) captured by the camera. Moreover, the sensing information may include data of a distance image (depth image) measured by the LiDAR sensor. Moreover, information indicating the brightness measured by the exposure meter of the camera may be output to the control unit 16.

Figure 3:
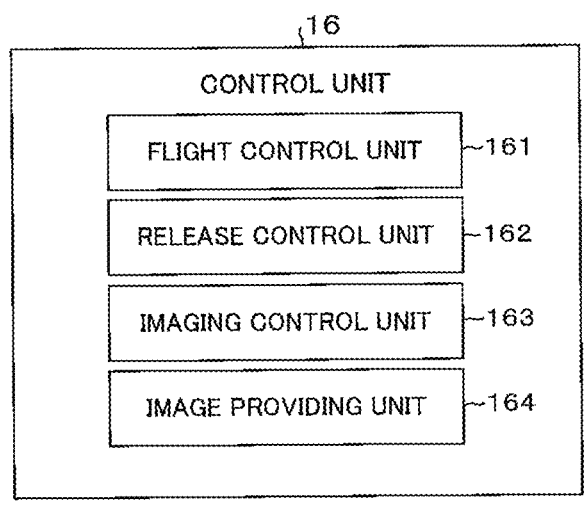
FIG. 3 is a diagram illustrating an example of functional blocks in a control unit 16.

The storage unit 15 includes a nonvolatile memory or the like, and stores various programs and data. Moreover, the storage unit 15 stores a vehicle ID for identifying the UAV 1. The vehicle ID is identification information for identifying the UAV 1. Incidentally, the storage unit 15 may store a pre-trained model generated by machine learning. Such a pre-trained model is for estimating an object (including a package and a below-mentioned feature) present on the ground from an image captured by the camera. The control unit 16 includes at least one CPU (Central Processing Unit) as least one processor, a ROM (Read Only Memory), a RAM (Random Access Memory), and the like. The RAM is provided with a buffer memory for temporarily storing images consecutively output from the camera. The buffer memory stores a plurality of consecutive images (image frames) at predetermined time intervals. FIG. 3 is a diagram illustrating an example of functional blocks in the control unit 16. As illustrated in FIG. 3, the control unit 16 functions as a flight control unit 161, a release control unit 162 (an example of a first control unit), an imaging control unit 163 (an example of a second control unit), an image providing unit 164, and the like in accordance with a program (program code group) stored in the ROM (or the storage unit 15).

The flight control unit 161 performs flight control to fly the UAV 1. The flight control includes take-off control, hovering control, and landing control. In the flight control, the rotation speed of the rotors and the current position, the posture, and the traveling direction of the UAV 1 are controlled using the positional information indicating the current position detected by the positioning unit 12, the sensing information sensed by the sensor unit 14, delivery destination information, and the like. As a result, the UAV 1 can autonomously fly toward the delivery destination. The delivery destination information may be set in the UAV 1 at, for example, the delivery station together with package information and recipient information, or may be transmitted from the management server 2 together with the package information and the recipient information and set. Here, the delivery destination information includes positional information (latitude and longitude) of the delivery destination, and the like. The package information includes a package ID for identifying the package to be delivered by the UAV 1, a photographic image of the package, and the like. An appearance characteristic value (quantity) of the package may be extracted from the photographic image of the package. The recipient information includes a user ID for identifying the recipient of the package, an e-mail address or a phone number of the recipient, and the like. Incidentally, while the UAV 1 is flying, the positional information of the UAV 1 and the vehicle ID of the UAV 1 are sequentially transmitted to the management server 2 by the communication unit 13. Moreover, the sensing information sensed by the sensor unit 14 and the vehicle ID of the UAV 1 may be sequentially transmitted to the management server 2 by the communication unit 13.

Figure 4:
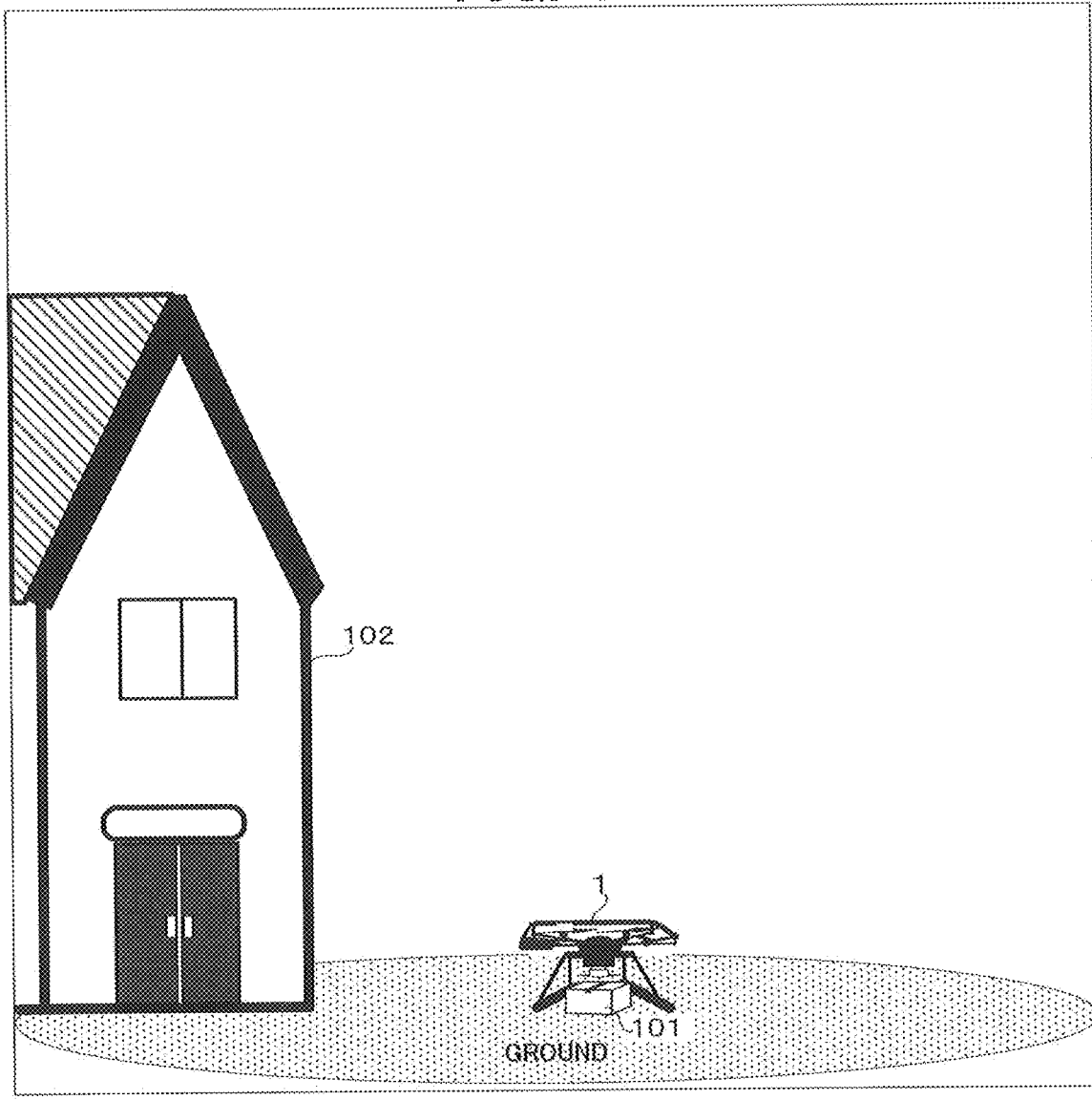
FIG. 4 is a diagram illustrating a state where the UAV 1 releases a package 101 in a landed state on a release location in the vicinity of a building 102.

The release control unit 162 performs release control to release the package from the UAV 1 at the release location. For example, the release control unit 162 outputs a control signal to the holding mechanism of the UAV 1 in a state where the UAV 1 is in a landed state on the release location to release the package from the holding member. FIG. 4 is a diagram illustrating a state where the UAV 1 releases a package 101 in a landed state on the release location (ground) in the vicinity of a building 102. As another example, the release control unit 162 may output a control signal to the holding mechanism of the UAV 1 in a state where the UAV 1 is hovering above the release location to feed the linear member. By doing so, the release control unit 162 releases the package from the holding member after lowering the holding member to the release location (for example, after the package lands on the ground). Alternatively, the release control unit 162 may output a control signal to the holding mechanism of the UAV 1 in the state where the UAV 1 is hovering at a position about several tens of cm to 2 m in the vertical direction from the release location to release (that is, drop) the package from the holding member. Incidentally, the release location of the package is preferably identified by the release control unit 162 on the basis of an image (for example, an RGB image or a distance image) from the optical sensor in the vicinity of the delivery destination.

The imaging control unit 163 uses the sensing information from the optical sensor to control at least the position and/or the orientation (direction) of the UAV 1 so that the package placed at the release location and a peripheral region of the package (that is, a peripheral region including the package) may fall within the angle of view of the camera. For example, at least the position and/or the orientation of the UAV 1 is controlled until the package having a preset appearance characteristic value is detected (object detection) (or until several seconds after the detection) from an image captured by the camera. Here, the position of the UAV 1 is at least the position of the UAV 1 in the horizontal direction and/or the position of the UAV 1 in the vertical direction. The control of the position in the vertical direction causes the UAV 1 to be raised or lowered. The orientation of the UAV 1 is, for example, a direction of the optical axis of the camera provided in the sensor unit 14 (a direction in which the optical axis of the photographing optical system extends). Then, the imaging control unit 163 saves an image (image data) of the peripheral region including the package captured by the camera in the storage unit 15 as an image for proving the delivery completion of the package (hereinbelow referred to as "a delivery proof image"). For example, the delivery proof image is saved as an image file of a predetermined file format. Incidentally, the imaging control unit 163 may cause the delivery proof image to be transmitted to the management server 2 by the communication unit 13 and saved.

Figure 5:
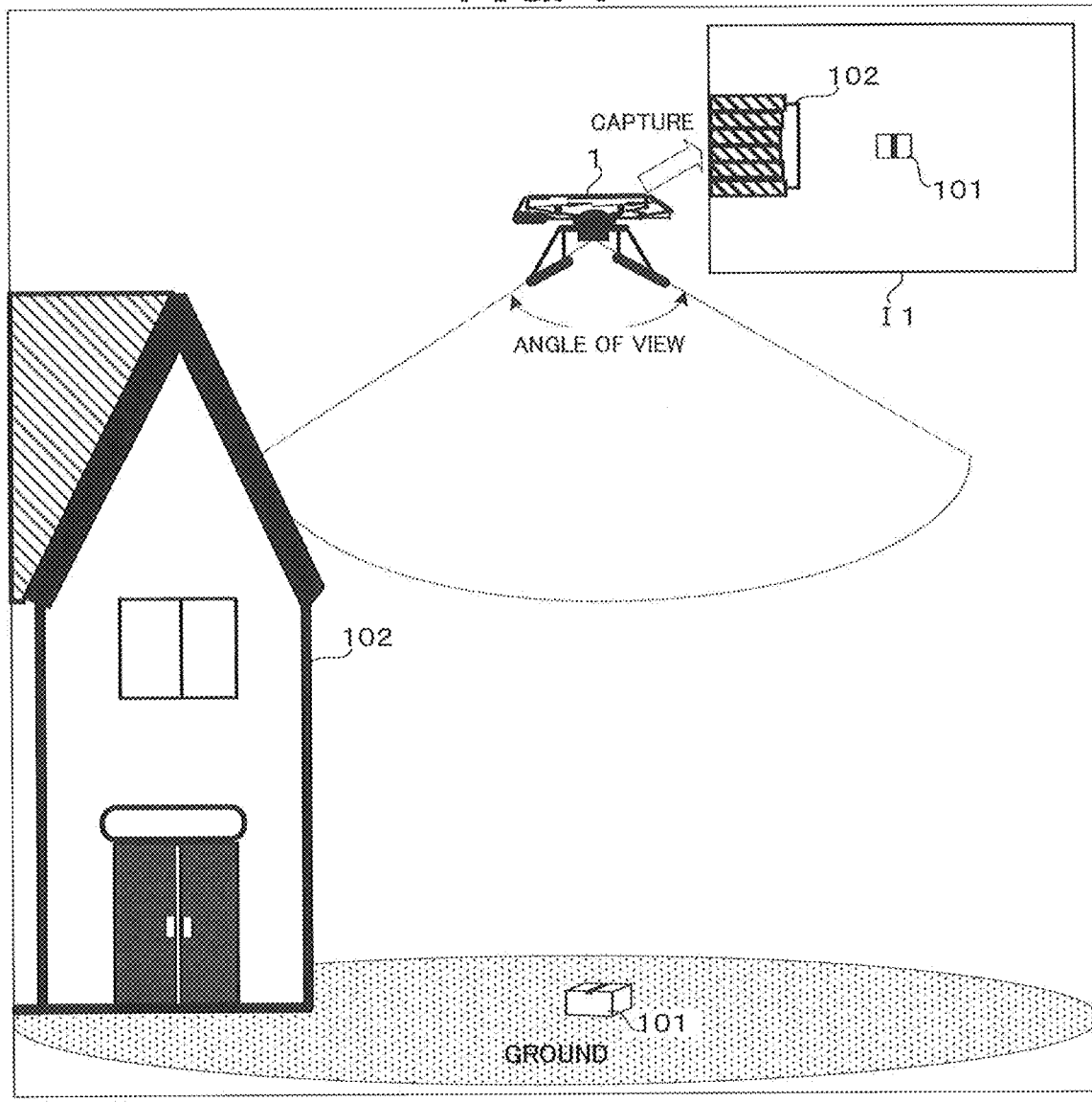
FIG. 5 is a diagram illustrating an example of an image I1 captured at a moment when the building 102 is detected as a feature serving as a mark in a peripheral region of a package 101.

Moreover, the imaging control unit 163 may detect a feature serving as a mark in addition to the package placed at the release location within a range falling within the angle of view of the camera. FIG. 5 is a diagram illustrating an example of an image I1 captured at a moment when the building 102 (a part thereof) is detected as a feature serving as a mark in the peripheral region of the package 101. In this case, the imaging control unit 163 saves, as the delivery proof image, at least the image I1 (that is, the image of the peripheral region including the package and the feature) captured at the moment when (timing at which) the feature in addition to the package is detected (that is, saves at least the image). By doing so, it is possible to save the delivery proof image specific to the delivery destination of the package. Here, the moment when the feature is detected is, for example, any time point between the time point at which the feature is detected and a time point at which a predetermined time (for example, several seconds) has elapsed after the time point. In this case, at least the position and/or the orientation of the UAV 1 is controlled until a feature having a preset appearance characteristic value (feature serving as the mark), in addition to a package having a preset appearance characteristic value, is detected from the image captured by the camera (that is, the package and the feature are detected on the same image frame). In particular, the imaging control unit 163 preferably detects a plurality of features at different positions in addition to the package. In this case, the imaging control unit 163 saves, as the delivery proof image, at least the image captured at a moment when the plurality of features (features serving as marks) in addition to the package are detected. Here, the plurality of features may be different types of features. By doing so, it is possible to further save the delivery proof image specific to the delivery destination of the package.

Moreover, the imaging control unit 163 may raise or lower the UAV 1 after the package is released by the release control unit 162, and detect a feature serving as the mark in addition to the package while the UAV 1 is being raised or lowered. At this time, the imaging control unit 163 preferably acquires information indicating the brightness around the UAV 1 measured by the exposure meter included in the camera, and changes the speed at which the UAV 1 is raised or lowered according to the brightness. For example, the darker the surroundings of the UAV 1, the lower the rising (ascending) speed of the UAV 1. As a result, the clearer delivery proof image can be saved. Moreover, the imaging control unit 163 may raise or lower the UAV 1 after the package is released by the release control unit 162, and cause the UAV 1 to hover (that is, cause the UAV 1 to temporarily stop from the moving state) at a moment when the feature serving as the mark is detected in addition to the package. In this case, the imaging control unit 163 saves, as the delivery proof image, the image captured while the UAV 1 is hovering. As a result, the clearer delivery proof image can be further saved.

Incidentally, the feature serving as the mark (landmark) is an object that can be visually recognized by the recipient of the package as the mark. Such the feature is, in particular, an object that exists in contact with the ground, such as a natural object and an artificial object, and may be a planar object or a three-dimensional object. Examples of the feature include a building, a garage, a fence, a gate door, a hedge, an entrance slope, a tree, a plant, an automobile, a bicycle, and the like. The appearance characteristic values of these features are set in advance. Moreover, the package and the feature serving as the mark may be estimated from the pre-trained model stored in the storage unit 15. According to this configuration, as the image captured by the camera is input into the pre-trained model, estimation result information such as a classification label (type) indicating each of the package and the feature serving as the mark is output from the pre-trained model. Here, in a case where a plurality of objects are detected from an image, a machine learning algorithm such as R-CNN (Region based Convolutional Neural Networks) and SSD (Single Shot Multibox Detector) is preferably used. In this case, as the image captured by the camera is input into the pre-trained model using a neural network, the estimation result information such as a bounding box, the classification label indicating an object, and a classification probability is output from the pre-trained model. The bounding box, the classification label, and the classification probability corresponds to each of the plurality of objects (that is, the package and the feature serving as the mark). The release control unit 162 detects the package and the feature serving as the mark on the basis of the output estimation result information.

Figure 6:
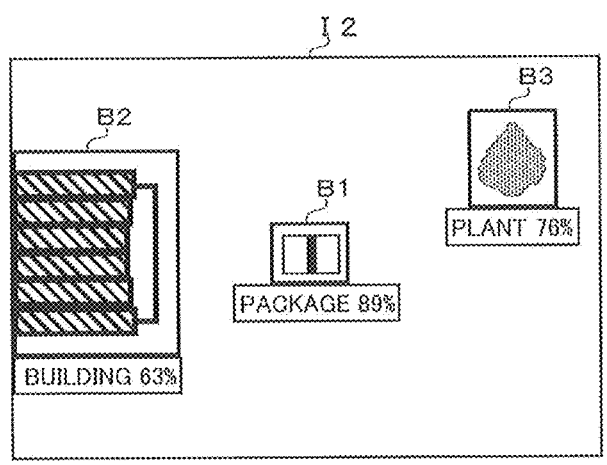
FIG. 6 is a conceptual diagram illustrating an example of a classification label indicating an object detected in an image I2 input to a pre-trained model and an classification probability for each bounding box.

FIG. 6 is a conceptual diagram illustrating an example of the classification label indicating an object detected in an image 12 input to the pre-trained model and the classification probability for each bounding box. In the example of FIG. 6, a package is illustrated in a bounding box B1, and 89% is illustrated as the classification probability corresponding to the package. Moreover, a building is illustrated as the feature serving as the mark in a bounding box B2, and 63% is illustrated as the classification probability corresponding to the building. Moreover, a plant is illustrated as the feature serving as the mark in a bounding box B3, and 76% is illustrated as the classification probability corresponding to the plant. Here, the feature having a classification probability equal to or less than a reference probability (for example, 60%) may be excluded from the detection target (that is, it is not detected as the feature serving as the mark). In this case, at least the position and/or the orientation of the UAV 1 is preferably controlled until the package and the feature serving as the mark each having a classification probability equal to or higher than the reference probability are detected.

Moreover, while controlling at least the position and/or the orientation of the UAV 1 (that is, while the range falling within the angle of view of the camera is changing), the imaging control unit 163 may calculate a change rate of a color value in each of a plurality of consecutive images captured by the camera, and detect the feature serving as the mark at a moment when the change rate becomes equal to or higher than a reference change rate (a first threshold value). Here, the color value is, for example, at least one of an R value, a G value, and a B value constituting a pixel. The change rate of the color value is a rate of change of the color value during a unit time. The moment when the change rate of the color value becomes equal to or higher than the reference change rate is, for example, any time point between the time point at which the change rate of the color value becomes equal to or higher than the reference change rate and a time point at which a predetermined time (for example, several seconds) has elapsed after the time point. Since the feature serving as the mark is detected at the moment when the change rate becomes equal to or higher than the reference change rate, the processing for detecting the feature serving as the mark is not performed while the change rate is lower than the reference change rate. As a result, it is possible to reduce the processing load applied to the CPU until the delivery proof image is saved, to reduce the power consumption of the battery, and also to shorten the time until the delivery proof image is saved.

Figure 7:
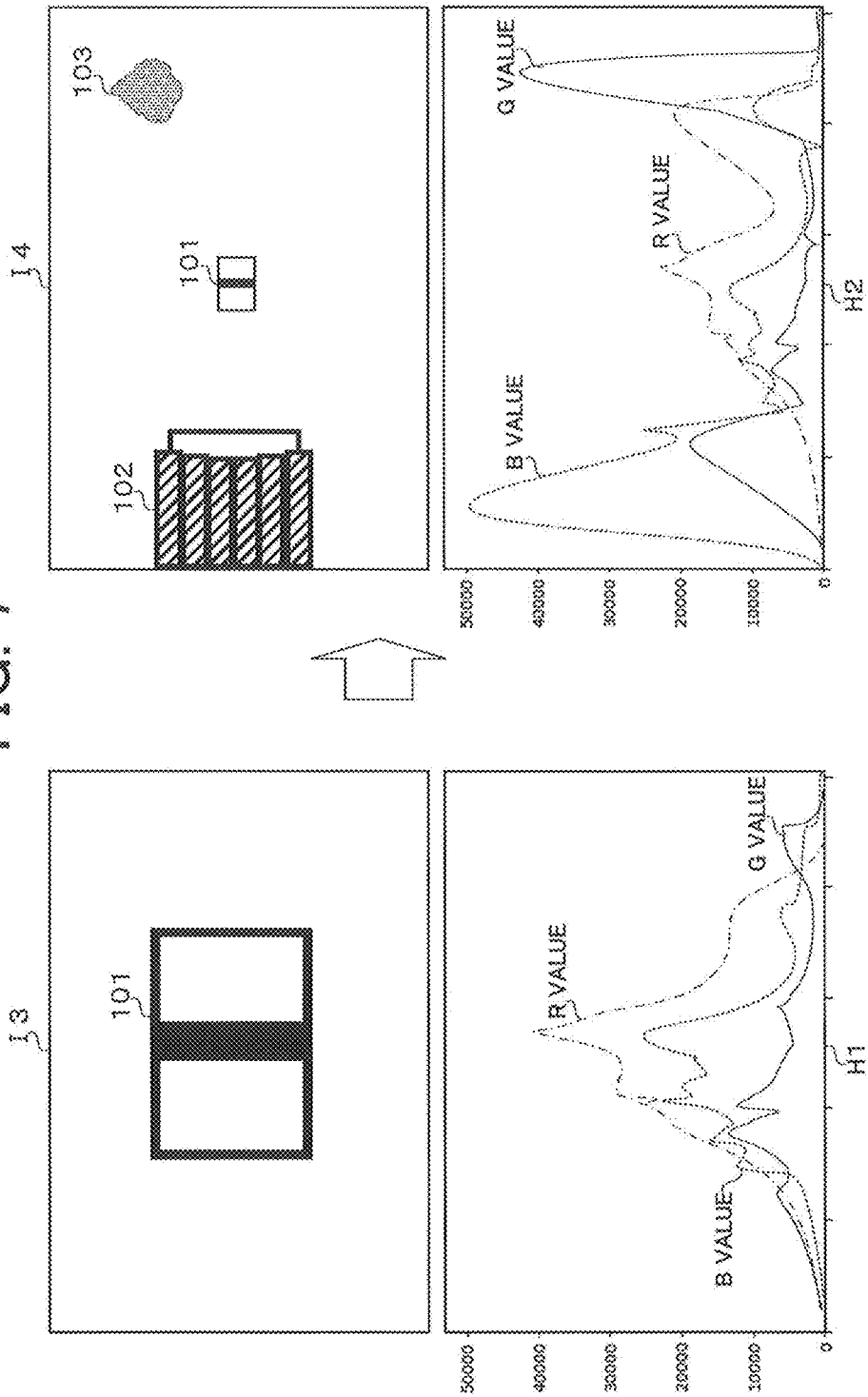
FIG. 7 is a diagram illustrating an example of captured images 13 and 14 and color value histograms H1 and H2 in respective images.

FIG. 7 is a diagram illustrating an example of captured images 13 and 14 and color value histograms H1 and H2 in the respective images. In FIG. 7, the left side illustrates an image 13 captured at a moment when the package 101 is released and a histogram H1 of color values in the image 13. On the other hand, in FIG. 7, the right side illustrates an image 14 captured at a moment when the change rate of the color values becomes equal to or higher than the reference change rate while the UAV 1 is being raised after the release of the package 101, and a histogram H2 of the color values in the image 14. The package 101 appearing in the image 13 can be visually recognized as if the package 101 appearing in the image I4 is enlarged. In the example of FIG. 7, the building 102 and the plant 103 (features serving as marks) appear within a range falling within the angle of view of the camera while the UAV 1 is being raised, so that the change rate of the G value and the B value becomes high (that is, higher than that before the appearance of the features serving as marks). As a result, the change rate exceeds the reference change rate, and the building 102 and the plant 103 are detected in addition to the package 101.

Moreover, the imaging control unit 163 may cause the UAV 1 to hover at a moment when the building 102 and the plant 103 are detected in addition to the package 101 as illustrated in FIG. 7. In this case, the imaging control unit 163 saves, as the delivery proof image, the image including the package 101, the building 102, and the plant 103 captured while the UAV 1 is hovering. Moreover, the imaging control unit 163 may save, as the delivery proof images, the image 13 captured at the moment when the package 101 is released and the image 14 captured at the moment when the building 102 and the plant 103 are subsequently detected in addition to the package 101 as illustrated in FIG. 7. As a result, even in a case where it is difficult for the recipient of the package 101 for which the unattended delivery has been performed to visually recognize the package 101 because the package appears in the image 14 is small, the recipient can easily visually recognize the package 101 as if enlarged from the image 13. Moreover, a moving image including the image captured at the moment when the feature is detected in addition to the package may be saved as the delivery proof image. In this case, for example, a moving image (for example, a moving image at a frame rate of several tens of frames) including a plurality of images included during a period from a time point before the moment when the feature in addition to the package is detected by a predetermined time (for example, several seconds to several tens of seconds) to a time point at which a predetermined time (for example, several seconds to several tens of seconds) has elapsed after the time point is saved as the delivery proof image.

As another example, while controlling at least the position and/or the orientation of the UAV 1, the imaging control unit 163 may calculate the change rate of the color value in each of a plurality of images consecutively captured by the camera, and save as the delivery proof image an image captured at least at a moment when the change rate becomes equal to or higher than the reference change rate. That is, it is assumed that the feature serving as the mark is included in the image captured at the moment when the change rate of the color value becomes equal to or higher than the reference change rate, and the image is saved as the delivery proof image. In this case, since it is not necessary to detect the feature serving as the mark from the image, it is possible to reduce the processing load applied to the CPU until the delivery proof image is saved, to reduce the power consumption of the battery, and also to shorten the time until the delivery proof image is saved. In this case, the imaging control unit 163 may calculate the change rate of the color value in each of a plurality of consecutive images captured while the UAV 1 is being raised or lowered, and cause the UAV 1 to hover at a moment when the change rate becomes equal to or higher than the reference change rate. Then, the imaging control unit 163 saves, as the delivery proof image, the image captured while the UAV 1 is hovering. At this time, the imaging control unit 163 may acquire information indicating the brightness around the UAV 1 measured by the exposure meter included in the camera, and change the speed at which the UAV 1 is raised or lowered according to the brightness.

Moreover, the imaging control unit 163 may identify proof appropriateness of the image captured as described above, and may save the captured image as the delivery proof image in a case where the proof appropriateness is equal to or higher than reference appropriateness (a second threshold value). As a result, it is possible to enhance the usefulness (in other words, the value) of the delivery proof image. Here, the proof appropriateness is a value quantitatively indicating how much the captured image is suitable as the delivery proof image. The more specific the image is to the delivery destination, the higher the proof appropriateness. The proof appropriateness may be calculated on the basis of a type of feature serving as the mark, the number of features, a positional relationship among a plurality of features, and the like. For example, the lower the frequency at which the feature included in the captured image appears in many delivery proof images (that is, delivery proof images associated with different delivery destinations) saved in the past, the higher the proof appropriateness of the image. Moreover, the greater the number of features included in the captured image, the higher the proof appropriateness of the image. Moreover, the lower the frequency at which the positional relationship among the plurality of features included in the captured image appears in many delivery proof images saved in the past, the higher the proof appropriateness of the image.

Incidentally, in a case where the proof appropriateness of the image (the image that is second) captured after the delivery proof image (the image that is first) is saved in the storage unit 15 is higher than the proof appropriateness of the delivery proof image (the image that is first) already saved, the imaging control unit 163 may delete the already saved delivery proof image from the storage unit 15 and save (update) the image that is second as a new delivery proof image. As a result, it is possible to further enhance the usefulness of the delivery proof image, and also to suppress the memory capacity of the storage unit 15 further than in a case of saving a plurality of delivery proof images.

The image providing unit 164 provides the delivery proof image saved by the processing method of the imaging control unit 163 to a terminal (for example, a smartphone) of the recipient of the package by a predetermined providing method. As a result, it is possible to visually notify the recipient of the delivery completion of the package. For example, the image providing unit 164 sends an e-mail describing a URL (Uniform Resource Locator) indicating the location (save location) of the saved delivery proof image to the e-mail address of the recipient of the package. As a result, the terminal of the recipient can acquire and display the delivery proof image by accessing the URL. Alternatively, the image providing unit 164 may send a message describing a URL for accessing the saved delivery proof image to a phone number of the recipient of the package by SMS (Short Message Service). Alternatively, the saved delivery proof image may be pushed to an application resident in the terminal of the recipient of the package.

[1-2. Configuration and Functions of Management Server 2]

Figure 8:
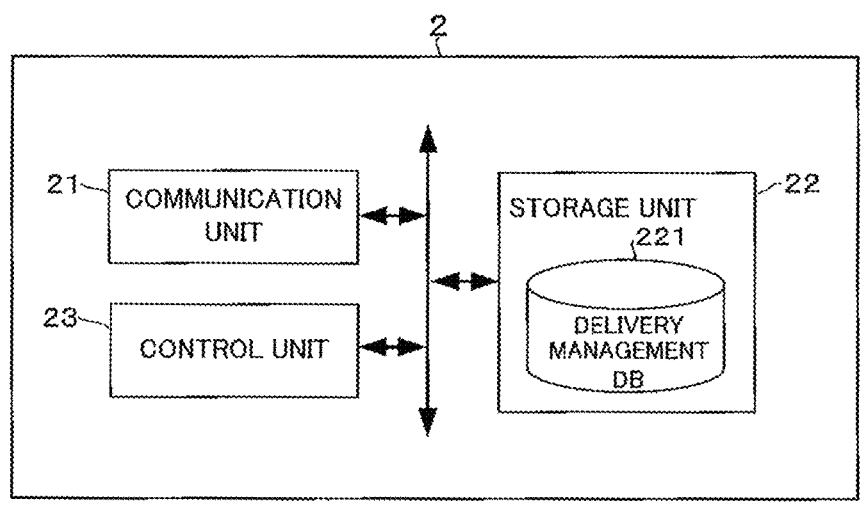
FIG. 8 is a diagram illustrating a schematic configuration example of a management server 2.

Next, a configuration and functions of the management server 2 will be described with reference to FIG. 8. FIG. 8 is a diagram illustrating a schematic configuration example of the management server 2. As illustrated in FIG. 8, the management server 2 includes a communication unit 21, a storage unit 22, a control unit 23, and the like. The communication unit 21 controls communication performed via the communication network NW. The positional information and the vehicle ID transmitted from the UAV 1 are received by the communication unit 21. The management server 2 can recognize the current position of the UAV 1 from the positional information of the UAV 1. Moreover, the sensing information and the vehicle ID transmitted from the UAV 1 are received by the communication unit 21. The storage unit 22 includes, for example, a hard disk drive or the like, and stores various programs and data. The storage unit 22 may store the above-described pre-trained model. Incidentally, the storage unit 22 may function as a save unit for saving the delivery proof image.

Moreover, in the storage unit 22, a delivery management database 221 and the like are constructed. The delivery management database 221 is a database for managing information related to delivery of the packages. In the delivery management database 221, the package information, vehicle information, the delivery destination information, delivery schedules, the recipient information, and the like are stored (registered) in association with each other. Here, the vehicle information includes information regarding the UAV 1 that delivers the package (for example, the vehicle ID or the like). Incidentally, in a case where the unattended delivery of a package is performed by the UAV 1, the delivery management database 221 stores a URL indicating the location of the delivery proof image of the package in association with the package information.

The control unit 23 includes a CPU, a ROM, a RAM, and the like. The control unit 23 monitors the current position of the UAV 1 and controls the UAV 1 by appropriately transmitting a control command to the UAV 1 (an example of the control device). Such control may include at least one of the flight control, the release control of the package, and imaging control of the UAV 1. Here, the imaging control is performed on the basis of the sensing information from the UAV 1. This processing method is similar to the processing method of the imaging control unit 163 of the UAV 1. Moreover, in a case where the delivery proof image is saved in the storage unit 22, the control unit 23 may provide the delivery proof image to the terminal of the recipient of the package. Such a providing method is similar to the providing method of the image providing unit 164 of the UAV 1.

[2. Operation of Delivery System S]

Next, an operation of the delivery system S will be described in Examples 1 to 4.

Example 1

Figure 9:
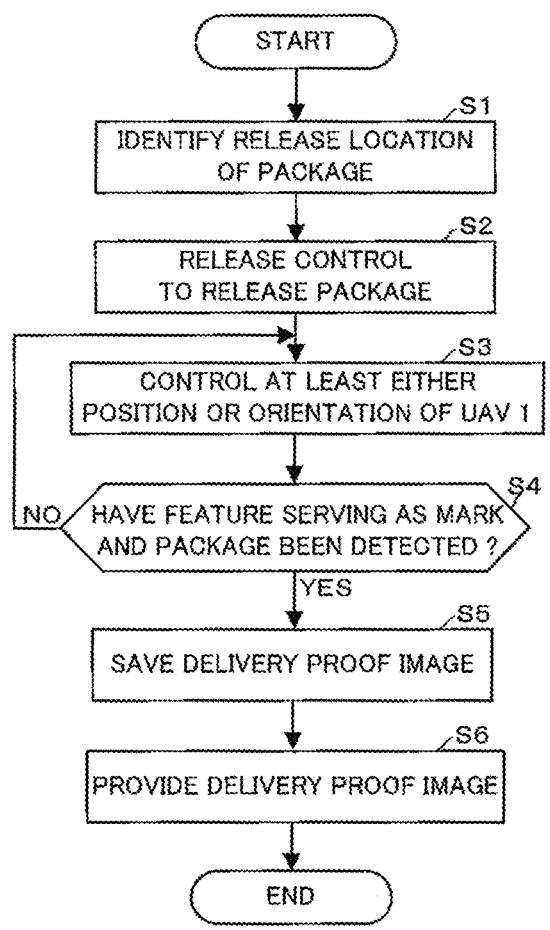
FIG. 9 is a flowchart illustrating an example of processing executed by the control unit 16 of the UAV 1 in Example 1.

First, Example 1 will be described with reference to FIG. 9. FIG. 9 is a flowchart illustrating an example of processing executed by the control unit 16 of the UAV 1 in Example 1. The processing illustrated in FIG. 9 is started, for example, in a case where the UAV 1 loading the package arrives above (in the sky over) the delivery destination. When the processing illustrated in FIG. 9 is started, the control unit 16 causes the UAV 1 to hover and identifies the release location of the package on the basis of the sensing information from the optical sensor (step S1). For example, in a case where the UAV 1 releases the package in the landed state, a flat (unobstructed) release location having a size equal to or larger than a two-dimensional size (for example, ym long× xm wide) necessary for landing of the UAV 1 is preferably identified. On the other hand, in a case where the UAV 1 releases the package in the hovering state, a flat release location having a size equal to or larger than the two-dimensional size of the package is preferably identified.

Subsequently, the control unit 16 performs the release control to release the package from the UAV 1 at the release location identified in step S1 (step S2). For example, after landing the UAV 1 at the release location, the release control unit 162 outputs a control signal to the holding mechanism of the UAV 1 to release the package from the holding member. Alternatively, the release control unit 162 outputs a control signal to the holding mechanism of the UAV 1 in the state where the UAV 1 is hovering above the release location to feed the linear member and release the package from the lowered holding member.

Subsequently, the control unit 16 acquires an image captured by the camera, and controls at least the position and/or the orientation of the UAV 1 so that the peripheral region including the package placed at the release location identified in step S1 falls within the angle of view of the camera (step S3). For example, in a case where the package is released when the UAV 1 is in the landed state on the release location, the imaging control unit 163 raises the UAV 1 so that the peripheral area including the package placed at the release location falls within the angle of view of the camera. On the other hand, in a case where the package is released in the state where the UAV 1 is hovering, the imaging control unit 163 lowers the UAV 1 so that the peripheral region including the package placed at the release location falls within the angle of view of the camera. In such imaging control, processing of detecting the package and the feature serving as the mark is started. Incidentally, the imaging control unit 163 may change the orientation of the UAV 1 while raising or lowering the UAV 1.

Subsequently, the control unit 16 determines whether or not the feature serving as the mark has been detected in addition to as the package from the image captured by the camera (step S4). For example, preferably, the imaging control unit 163 inputs the captured image into the pre-trained model, and determines whether or not the feature serving as the mark has been detected in addition to the package on the basis of the estimation result information output from the pre-trained model. In this case, in a case where the estimation result information includes the bounding box, the classification label indicating the object, and the classification probability corresponding to each of the package and the feature (one or a plurality of features), and each classification probability is equal to or higher than the reference probability, it is determined that the feature serving as the mark has been detected in addition to the package. In a case where it is determined that the feature serving as the mark has been detected in addition to the package (step S4: YES), the processing proceeds to step S5. On the other hand, in a case where it is determined that no feature serving as the mark has been detected in addition to the package (step S4: NO), the processing returns to step S3. When the processing returns to step S3, the control unit 16 changes at least the position and/or the orientation of the UAV 1 while keeping the peripheral region including the package within the angle of view of the camera. At this time, the imaging control unit 163 may change the orientation of the UAV 1 while raising or lowering the UAV 1.

Incidentally, the sensing information from the optical sensor may be transmitted from the UAV 1 to the management server 2. In this case, the management server 2 inputs the image included in the sensing information into the pre-trained model, and transmits the estimation result information output from the pre-trained model to the UAV 1. In this case, the imaging control unit 163 determines whether or not the feature serving as the mark has been detected in addition to the package on the basis of the estimation result information received from the management server 2. Alternatively, the management server 2 may determine whether or not the feature serving as the mark has been detected in addition to the package on the basis of the estimation result information output from the pre-trained model, and transmit the determination result to the UAV 1. In this case, the imaging control unit 163 determines whether or not the feature serving as the mark has been detected in addition to the package on the basis of the determination result received from the management server 2.

In step S5, the control unit 16 causes the storage unit 15 to save, as the delivery proof image, the image captured at the moment when the feature serving as the mark is detected in addition to the package. Incidentally, in a case where the imaging control unit 163 determines in step S4 that the feature serving as the mark has been detected in addition to the package, the UAV 1 may be caused to hover. In this case, the imaging control unit 163 causes the storage unit 15 to save, as the delivery proof image, the image captured while the UAV 1 is hovering. Moreover, the imaging control unit 163 may save, as the delivery proof images, the image captured at the moment when the package is released and the image captured at the moment when the feature is detected in addition to the package thereafter. Alternatively, the imaging control unit 163 may cause the storage unit 15 to save, as the delivery proof image, a moving image including a plurality of images included during a period from the moment when the package is released to a time point at which a predetermined time (for example, several seconds to several tens of seconds) has elapsed after the moment when the feature is detected in addition to the package.

Subsequently, the control unit 16 provides the delivery proof image saved in step S5 to the terminal of the recipient of the package by means of the image providing unit 164 (step S6). For example, a URL indicating the location of the saved delivery proof image is generated, and an e-mail describing the URL is sent to the e-mail address of the recipient of the package. After the delivery proof image is provided to the terminal of the recipient of the package, the UAV 1 returns to the delivery station or moves to the next delivery destination. Incidentally, the image providing unit 164 may save the delivery proof image in the storage unit 22 of the management server 2 by transmitting a save request including the delivery proof image saved in step S5 to the management server 2. In this case, the management server 2 provides the delivery proof image saved in the storage unit 22 to the terminal of the recipient of the package by means of the image providing unit 164.

Example 2

Figure 10:
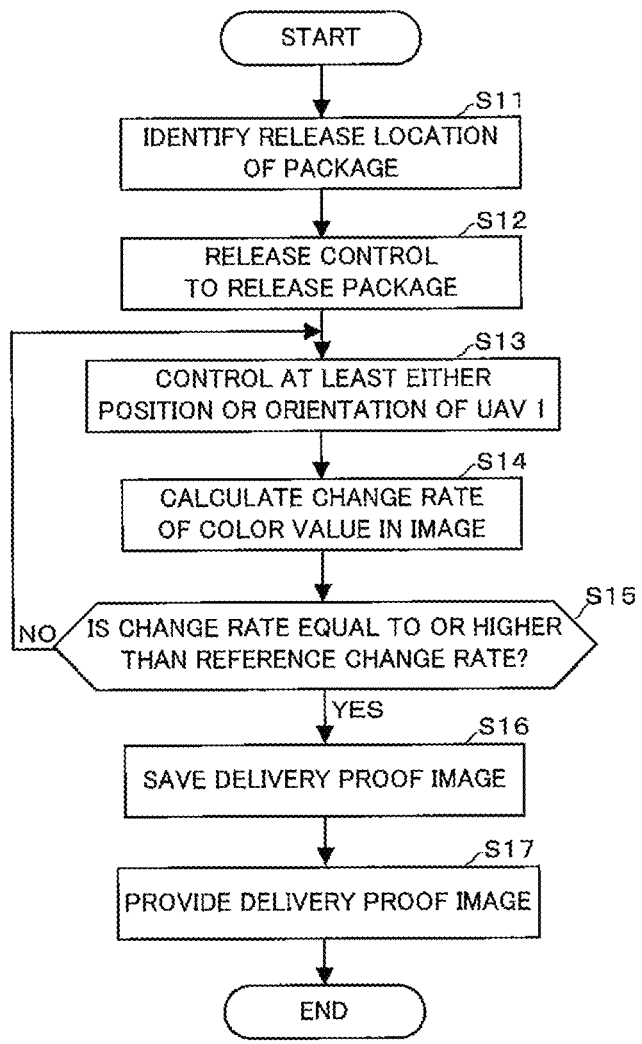
FIG. 10 is a flowchart illustrating an example of processing executed by the control unit 16 of the UAV 1 in Example 2.

Next, Example 2 will be described with reference to FIG. 10. FIG. 10 is a flowchart illustrating an example of processing executed by the control unit 16 of the UAV 1 in Example 2. Incidentally, the processing in steps S11 to S13 illustrated in FIG. 10 is similar to the processing in steps S1 to S3 illustrated in FIG. 9.

In step S14, the control unit 16 calculates the change rate of the color value in the image captured by the camera. For example, the change rate of the color value is calculated from the image captured the unit time before (in other words, several frames before). Subsequently, the control unit 16 determines whether or not the change rate calculated in step S14 is equal to or higher than the reference change rate (step S15). In a case where it is determined that the change rate of the color value is equal to or higher than the reference change rate (step S15: YES), the processing proceeds to step S16. On the other hand, in a case where it is determined that the change rate of the color value is not equal to or higher than the reference change rate (step S15: NO), the processing returns to step S13. The processing when the processing returns to step S13 is similar to the processing when the processing returns to step S3.

In step S16, the control unit 16 causes the storage unit 15 to save, as the delivery proof image, the image captured at the moment when the change rate of the color value becomes equal to or higher than the reference change rate. Incidentally, in a case where the imaging control unit 163 determines in step S15 that the change rate of the color value is equal to or higher than the reference change rate, the UAV 1 may be caused to hover. In this case, the imaging control unit 163 causes the storage unit 15 to save, as the delivery proof image, the image captured while the UAV 1 is hovering. Incidentally, the processing in step S17 illustrated in FIG. 10 is similar to the processing in step S6 illustrated in FIG. 9.

Example 3

Figure 11:
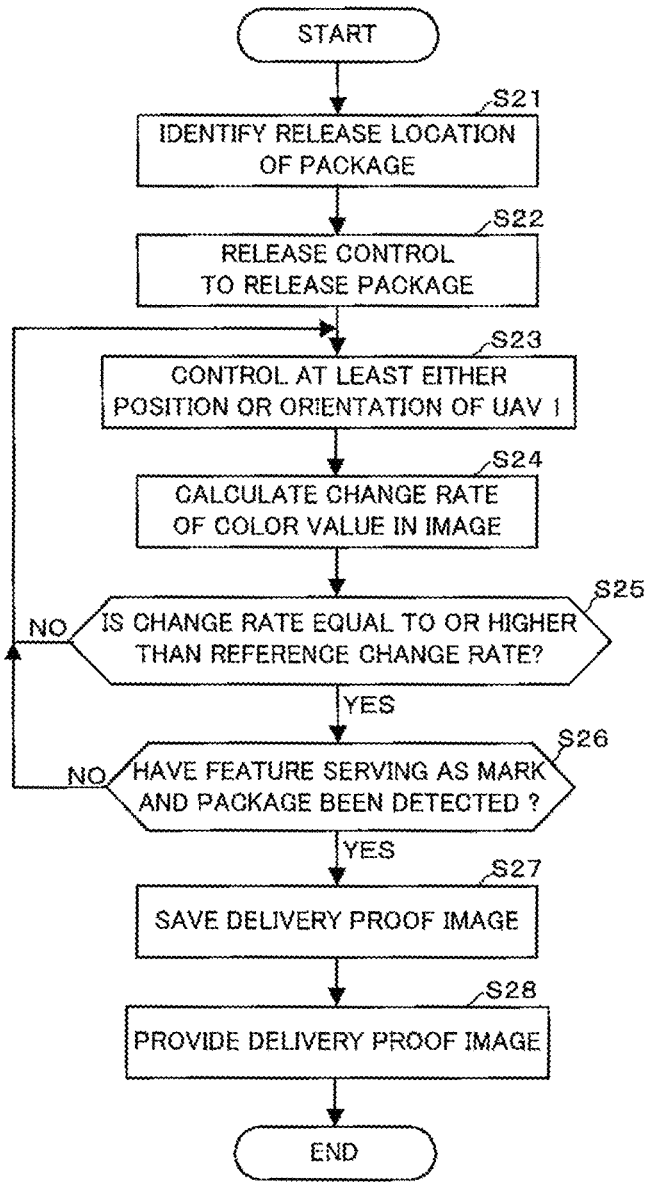
FIG. 11 is a flowchart illustrating an example of processing executed by the control unit 16 of the UAV 1 in Example 3.

Next, Example 3 will be described with reference to FIG. 11. FIG. 11 is a flowchart illustrating an example of processing executed by the control unit 16 of the UAV 1 in Example 3. Incidentally, the processing in steps S21 to S23 illustrated in FIG. 11 is similar to the processing in steps S1 to S3 illustrated in FIG. 9.

In step S24, similarly to step S14, the control unit 16 calculates the change rate of the color value in the image captured by the camera. Subsequently, as in step S15, the control unit 16 determines whether or not the change rate calculated in step S24 is equal to or higher than the reference change rate (step S25). In a case where it is determined that the change rate of the color value is equal to or higher than the reference change rate (step S25: YES), the processing proceeds to step S26. On the other hand, in a case where it is determined that the change rate of the color value is not equal to or higher than the reference change rate (step S25: NO), the processing returns to step S23. The processing when the processing returns to step S23 is similar to the processing when the processing returns to step S3.

In step S26, the control unit 16 causes the imaging control unit 163 to determine whether or not the feature serving as the mark has been detected in addition to the package from the image captured at the moment when the change rate of the color value becomes equal to or higher than the reference change rate. In a case where it is determined that the feature serving as the mark has been detected in addition to the package (step S26: YES), the processing proceeds to step S27. Incidentally, the processing in steps S27 and S28 illustrated in FIG. 11 is similar to the processing in steps S5 and S6 illustrated in FIG. 9. On the other hand, in a case where it is determined that no feature serving as the mark has been detected in addition to the package (step S26: NO), the processing returns to step S23. The processing when the processing returns to step S23 is similar to the processing when the processing returns to step S3.

Example 4

Figure 12:
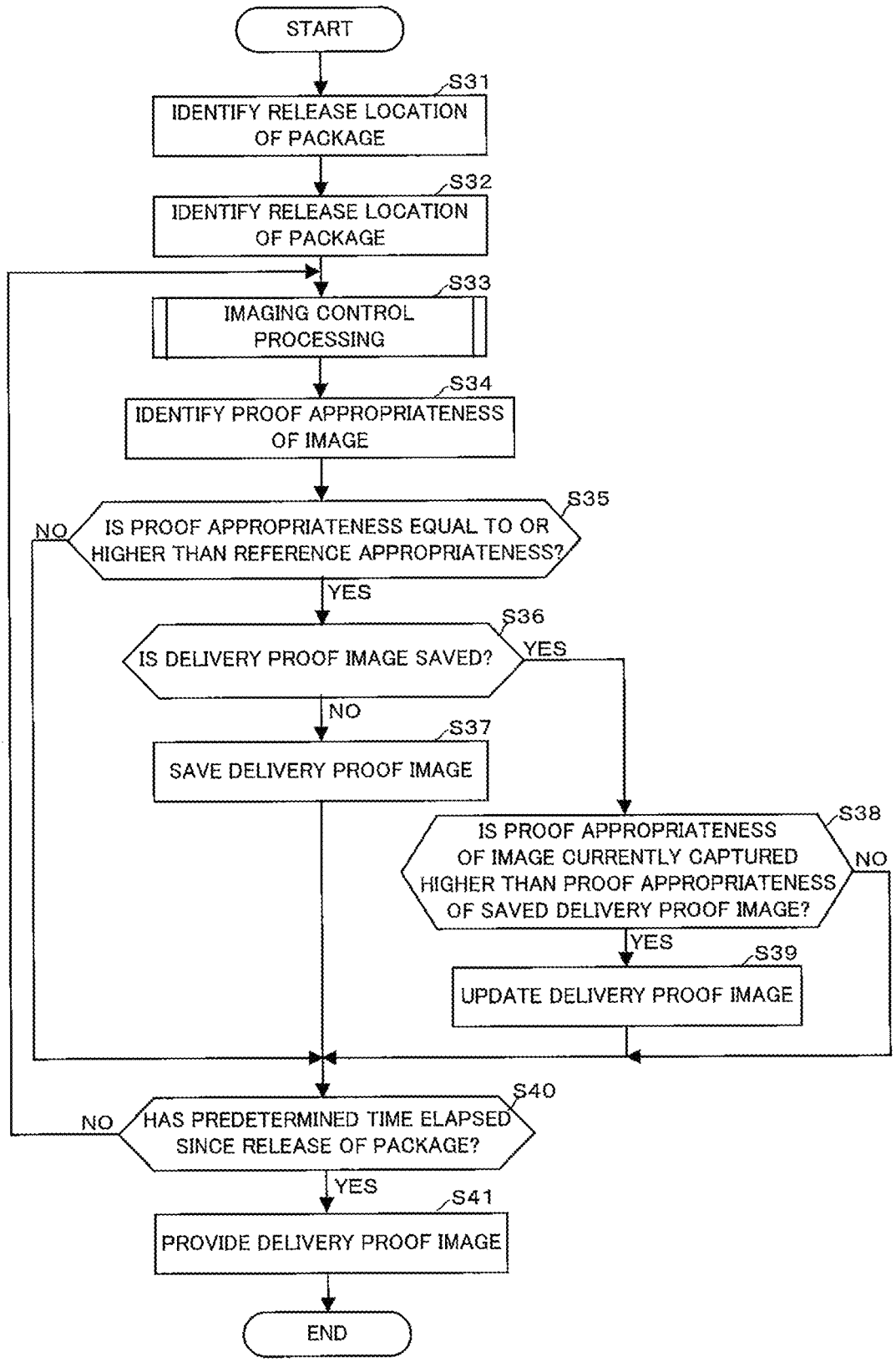
FIG. 12 is a flowchart illustrating an example of processing executed by the control unit 16 of the UAV 1 in Example 4.

Next, Example 4 will be described with reference to FIG. 12. FIG. 12 is a flowchart illustrating an example of processing executed by the control unit 16 of the UAV 1 in Example 4. Incidentally, the processing in steps S31 and S32 illustrated in FIG. 12 is similar to the processing in steps S1 and S2 illustrated in FIG. 9. In the imaging control processing in step S33 illustrated in FIG. 12, the processing in steps S3 and S4 illustrated in FIG. 9, the processing in steps S13 to S15 illustrated in FIG. 10, or the processing in steps S23 to S26 illustrated in FIG. 11 is performed.

In step S34, the control unit 16 causes the imaging control unit 163 to identify the proof appropriateness of the image captured at the moment when the feature serving as the mark is detected in addition to the package or the moment when the change rate of the color value becomes equal to or higher than the reference change rate. Subsequently, the control unit 16 causes the imaging control unit 163 to determine whether or not the proof appropriateness identified in step S34 is equal to or higher than the reference appropriateness (step S35). In a case where it is determined that the proof appropriateness is equal to or higher than the reference appropriateness (step S35: YES), the processing proceeds to step S36. On the other hand, in a case where it is determined that the proof appropriateness is not equal to or higher than the reference appropriateness (step S35: NO), the processing proceeds to step S40.

In step S36, the control unit 16 determines whether or not any delivery proof image and the proof appropriateness thereof are saved in the storage unit 15. In a case where it is determined that the delivery proof image and its proof appropriateness are not saved in the storage unit 15 (step S36: NO), the control unit 16 saves the image captured at the above-described moment in the storage unit 15 as the delivery proof image (step S37). On the other hand, in a case where it is determined that the delivery proof image and the proof appropriateness thereof have already been saved in the storage unit 15 (step S36: YES), the processing proceeds to step S38.

In step S38, the control unit 16 causes the imaging control unit 163 to determine whether or not the proof appropriateness of the image (the image that is second) currently captured at the above-described moment is higher than the proof appropriateness of the delivery proof image (the image that is first) already saved. In a case where it is determined that the proof appropriateness of the image captured at the above-described moment is higher than the proof appropriateness of the already saved delivery proof image (step S38: YES), the processing proceeds to step S39. On the other hand, in a case where it is determined that the proof appropriateness of the image captured at the above-described moment is not higher than the proof appropriateness of the already saved delivery proof image (step S38: NO), the processing proceeds to step S40.

In step S39, the control unit 16 deletes the already saved delivery proof image from the storage unit 15, and newly saves the image captured at the above-described moment as the delivery proof image. As a result, the delivery proof image is updated. At this time, the proof appropriateness of the newly saved delivery proof image is saved in the storage unit 15 in association with the delivery proof image, and the processing proceeds to step S40.

In step S40, the control unit 16 determines whether or not a predetermined time has elapsed since the release of the package. In a case where it is determined that the predetermined time has not elapsed from the release of the package (step S40: NO), the processing returns to step S33. At this time, the control unit 16 may lower the reference appropriateness. On the other hand, in a case where it is determined that the predetermined time has elapsed since the release of the package (step S40: YES), the processing proceeds to step S41.

In step S41, the control unit 16 provides the finally saved delivery proof image to the terminal of the recipient of the package by means of the image providing unit 164. Incidentally, the image providing unit 164 may transmit the save request including the finally saved delivery proof image and the proof appropriateness thereof to the management server 2. As a result, the management server 2 saves the delivery proof image and the proof appropriateness thereof in the storage unit 22 in response to the save request.

As described above, according to the embodiment, at least the position and/or the orientation of the UAV 1 is controlled so that the package placed at the release location by the UAV 1 and the peripheral region of the package fall within the angle of view of the camera, and the image of the peripheral region including the package captured by the camera is saved as the delivery proof image. Therefore, even in a case where the UAV 1 that does not need a deliverer performs the unattended delivery, it is possible to save an appropriate image for proving the delivery completion of the package. Moreover, according to the configuration in which the feature serving as the mark is detected in addition to the package placed in the release location and the image captured at a moment when the feature is detected in addition to the package is saved as the delivery proof image, the delivery proof image specific to the delivery destination of the package can be saved. As a result, for example, even in a case where the package is placed on a large site of the recipient's house, the recipient of the package can easily determine the position.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. In the above-described embodiment, the control unit 23 of the management server 2 may be configured to sequentially receive the sensing information including an image captured by the camera from the UAV 1, and perform the imaging control of the UAV 1 on the basis of the captured image. In this case, the control unit 23 of the management server 2 transmits, to the UAV 1, a control command for controlling at least the position and/or the orientation of the UAV 1 so that the peripheral region including the package falls within the angle of view on the basis of the captured image. Then, the control unit 23 of the management server 2 causes the storage unit 22 to save the image of the peripheral region including the package captured by the camera of the UAV 1 as the delivery proof image, and provides the saved delivery proof image to the terminal of the recipient of the package.

In this case, the control unit 23 of the management server 2 may detect the feature serving as the mark in addition to the package, and save an image captured at a moment when the feature is detected in addition to the package in the storage unit 22 as the delivery proof image. Moreover, the control unit 23 of the management server 2 may calculate the change rate of the color value in each of a plurality of images consecutively captured by the camera of the UAV 1, and detect the feature serving as the mark at a moment when the change rate becomes equal to or higher than the reference change rate. Furthermore, the control unit 23 of the management server 2 may identify the proof appropriateness of the captured image, and save the captured image as the delivery proof image in a case where the proof appropriateness is equal to or higher than the reference appropriateness.

Moreover, in the above-described embodiment, the UAV has been described as an example of the unmanned vehicle, but the present invention is also applicable to a flying robot and the like. Moreover, the above-described embodiment is also applicable to a UGV (Unmanned Ground Vehicle) capable of loading a package and autonomously traveling on the ground in an unmanned manner (however, hovering is excluded). The UGV may be one having a plurality of wheels, a robot (for example, a biped walking robot) having no wheels, or the like. For example, in a case where the UGV arrives near a delivery destination, the UGV identifies a release location of the package and causes the package to be released (unloaded) through an unloading mechanism of the UGV at the release location. Then, the UGV controls at least the position and/or the orientation of the UGV such that the package placed at the release location and the peripheral region of the package fall within the angle of view of the camera of the UGV, and causes a save unit to save the image of the peripheral region including the package captured by the camera as a delivery proof image. Moreover, the package and the peripheral region of the package may be made to fall within the angle of view by controlling the orientation of the camera mounted on the unmanned vehicle instead of controlling the orientation of the unmanned vehicle or at the same time as controlling the orientation of the unmanned vehicle, and this case is also included in the technical scope of the present invention.

REFERENCE SIGNS LIST

1 UAV
2 Management server
11 Drive unit
12 Positioning unit
13 Communication unit
14 Sensor unit
15 Storage unit
16 Control unit
161 Flight control unit
162 Release control unit
163 Imaging control unit
164 Image providing unit
21 Communication unit
22 Storage unit
23 Control unit
S Delivery System

The invention claimed is:

1. An unmanned vehicle for delivering a package, the unmanned vehicle comprising:
 a camera configured to image a range falling within an angle of view;
 at least one memory configured to store computer program code; and
 at least one processor configured to read the program code and operate as instructed by the program code, the program code comprising:
  first control code configured to cause at least one of the at least one processor to cause the unmanned vehicle to release the package from the unmanned vehicle in a release location; and
  second control code configured to cause at least one of the at least one processor to:
   control at least one of a position or an orientation of the unmanned vehicle such that the package and a peripheral region of the package are included within the angle of view; and
   save at least one image captured by the camera that comprises the package and the peripheral region to a storage for confirming delivery of the package,
  wherein the second control code is further configured to cause at least one of the at least one processor to:
   calculate a color value change rate at a same pixel position in a plurality of consecutive images captured by the camera over a predefined unit of time; and
   detect the one or more features based on the color value change rate being greater than or equal to a first threshold value over the predefined unit of time.

2. The unmanned vehicle according to claim 1, wherein the second control code is configured to cause at least one of the at least one processor to:
 detect, in the range, in addition to the package, one or more features for confirming a delivery location of the package; and
 based on the one or more features being detected, save to the storage the at least one image such that the at least one image further comprises the one or more features.

3. The unmanned vehicle according to claim 2, wherein the one or more features comprise a plurality of features located at different positions within the range, and wherein the second control code is configured to cause at least one of the at least one processor to save to the storage the at least one image such that the at least one image further comprises the plurality of features.

4. The unmanned vehicle according to claim 2,
 wherein the unmanned vehicle is configured to fly autonomously, and
 wherein the second control code is configured to cause at least one of the at least one processor to:
  raise or lower the unmanned vehicle based on the package being released; and
  detect the package and the one or more features based on the unmanned vehicle is-being raised or lowered.

5. The unmanned vehicle according to claim 4, wherein the second control code is configured to cause at least one of the at least one processor to:
 cause the unmanned vehicle to hover based on the package and the one or more features being detected; and
 save the at least one image based on the unmanned vehicle is hovering.

6. The unmanned vehicle according to claim 4, wherein the camera comprises an exposure meter, and
 wherein the second control code is configured to cause at least one of the at least one processor to:
  acquire, via the exposure meter, exposure information indicating a brightness level around the unmanned vehicle; and
  change a speed at which the unmanned vehicle is raised or lowered based on the brightness level.

7. The unmanned vehicle according to claim 2, wherein the second control code is configured to cause at least one of the at least one processor to:
 save to the storage a third image, from among the at least one image, that comprises the package and the peripheral region, wherein the third image is captured based on the package being released; and
 save to the storage a fourth image, from among the at least one image, that comprises the package, the peripheral region, and the one or more features, wherein the fourth image is captured based on the one or more features and the package being detected.

8. The unmanned vehicle according to claim 1, wherein the second control code is configured to cause at least one of the at least one processor to:
 calculate a color value change rate across a plurality of consecutive images continuously captured by the camera; and
 save a first image, from among the at least one image, to the storage based on the color change rate being greater than or equal to a first threshold value.

9. The unmanned vehicle according to claim 8, wherein the unmanned vehicle is configured to fly autonomously, and
 wherein the second control code is configured to cause at least one of the at least one processor to:
  raise or lower the unmanned vehicle based on the package being released; and
  calculate the color value change rate based on the unmanned vehicle being raised or lowered.

10. The unmanned vehicle according to claim 9, wherein the second control code is configured to cause at least one of the at least one processor to:
 cause the unmanned vehicle to hover based on the color change rate being greater than or equal to the first threshold value; and save a second image, from among the at least one image, that is captured based on the unmanned vehicle hovering.

11. The unmanned vehicle according to claim 9, wherein the camera comprises an exposure meter, and
wherein the second control code is configured to cause at least one of the at least one processor to:
acquire, via the exposure meter, exposure information indicating a brightness level around the unmanned vehicle; and
change a speed at which the unmanned vehicle is raised or lowered based on the brightness level.

12. The unmanned vehicle according to claim 1, wherein the second control code is configured to cause at least one of the at least one processor to;
identify a proof appropriateness level of e at least one image, wherein the proof appropriateness level indicates a quantified strength value for using the at least one image as a proof of delivery; and
save the at least one image to the storage based on the proof appropriateness level being greater than or equal to a second threshold value.

13. The unmanned vehicle according to claim 12, wherein the at least one image comprises:
a fifth image with a first proof appropriateness level, and
a sixth image, with a second proof appropriateness level, that is captured after the fifth image is saved to the storage,
wherein the second proof appropriateness level is greater than the first proof appropriateness level, and
wherein the second control code is configured to cause at least one of the at least one processor to:
delete the fifth image from the storage; and
save the sixth image to the storage.

14. The unmanned vehicle according to claim 1, wherein the program code further comprises image providing code configured to cause at least one of the at least one processor to provide a recipient of the package access to the at least one image via a terminal of the recipient.

15. A delivery system for delivering a package via an unmanned vehicle comprising a mounted camera, wherein the unmanned vehicle is configured to image a range falling within an angle of view via the mounted camera, the delivery system comprising:
at least one memory configured to store computer program code; and
at least one processor configured to read the program code and operate as instructed by the program code, the program code comprising control code configured to cause at least one of the at least one processor to:
control at least one of a position or an orientation of the unmanned vehicle such that a package is released from the unmanned vehicle in a release location, and the package and a peripheral region of the package are included within the angle of view; and
save at least one image captured by the camera that comprises the package and the peripheral region to a storage for confirming delivery of the package,
wherein the control code is further configured to cause at least one of the at least one processor to:
calculate a color value change rate at a same pixel position in a plurality of consecutive images captured by the camera over a predefined unit of time; and
detect the one or more features based on the color value change rate being greater than or equal to a first threshold value over the predefined unit of time.

16. A control device for an unmanned vehicle comprising a mounted camera, wherein the unmanned vehicle is configured to image a range falling within an angle of view and deliver a package, the control device comprising:
at least one memory configured to store computer program code; and
at least one processor configured to read the program code and operate as instructed by the program code, the program code comprising control code configured to cause at least one of the at least one processor to:
control at least one of a position or an orientation of the unmanned vehicle such that the package is released from the unmanned vehicle in a release location, and the package and a peripheral region of the package are included within the angle of view; and
save at least one image captured by the camera that comprises the peripheral region captured by the camera to a storage for confirming delivery of the package,
wherein the control code is further configured to cause at least one of the at least one processor to:
calculate a color value change rate at a same pixel position in a plurality of consecutive images captured by the camera over a predefined unit of time; and
detect the one or more features based on the color value change rate being greater than or equal to a first threshold value over the predefined unit of time.

* * * * *